United States Patent [19]

Hodgson

[11] 4,074,639
[45] Feb. 21, 1978

[54] TRAILER FOR FARM TRACTORS WITH DRIVEN MEMBER POWERED BY P.T.O.

[75] Inventor: James H. Hodgson, Vinton, Iowa

[73] Assignee: Chromalloy American Corporation, New York, N.Y.

[21] Appl. No.: 767,380

[22] Filed: Feb. 10, 1977

[51] Int. Cl.² .................................... A01C 23/02
[52] U.S. Cl. ........................................ 111/6; 172/79; 172/439; 239/146; 280/410; 280/460 A
[58] Field of Search .............. 111/6, 7, 1, 85, 86; 239/146, 148, 149, 155, 156, 162, 172, 175, 176, 662, 661, 699; 222/156; 280/456, 456 A, 461 A, 460, 460 A, 411 R, 411 A, 411 B, 411 C, 479, 492, 408, 410; 172/439, 448, 451, 248, 408, 410, 47, 76, 79, 438, 443

[56] References Cited

U.S. PATENT DOCUMENTS

| 3,136,485 | 6/1964 | Bellows et al. ................ 239/148 |
| 3,218,999 | 11/1965 | Pattison ........................... 111/7 |
| 3,294,407 | 12/1966 | Vander Pol ...................... 239/148 |
| 3,378,279 | 4/1968 | Jacobs ............................ 111/7 X |
| 3,489,320 | 1/1970 | Mackinnon ...................... 222/156 |
| 3,544,010 | 12/1970 | Jurdyc ........................... 239/172 X |
| 3,793,967 | 2/1974 | Van den Berg ................... 111/7 |
| 4,014,271 | 3/1977 | Rohlf et al. ..................... 111/7 |

FOREIGN PATENT DOCUMENTS

| 2,018,710 | 4/1970 | Germany ......................... 111/7 |
| 801,630 | 9/1958 | United Kingdom ............... 239/155 |

Primary Examiner—Edgar S. Burr
Assistant Examiner—James R. Feyrer
Attorney, Agent, or Firm—Wegner, Stellman, McCord, Wiles & Wood

[57] ABSTRACT

A wheeled trailer, such as a liquid manure spreader, has a draft tongue which is adapted for attachment to a draft connection of a farm tractor so as to trail behind a soil working implement, such as a liquid manure injector, which is mounted upon the tractor three point hitch; and a driven member, such as a fertilizer pump, is driven from the tractor power take-off which is in a horizontal plane above that of the draft connection. The length of the draft tongue is sufficient to avoid interference between the implement and the vehicle on turns. The power train for the driven member consists of a drive shaft connected to the driven member which is in a horizontal plane below that of the p.t.o., an input shaft on the forward part of the tongue which is in the plane of the p.t.o. and is detachably connected to the p.t.o. by a drive link, and a driving connection between the input shaft and the drive shaft. A hood both mounts and covers the input shaft and the driving connection, and a shield covers the forward part of the drive shaft.

8 Claims, 8 Drawing Figures

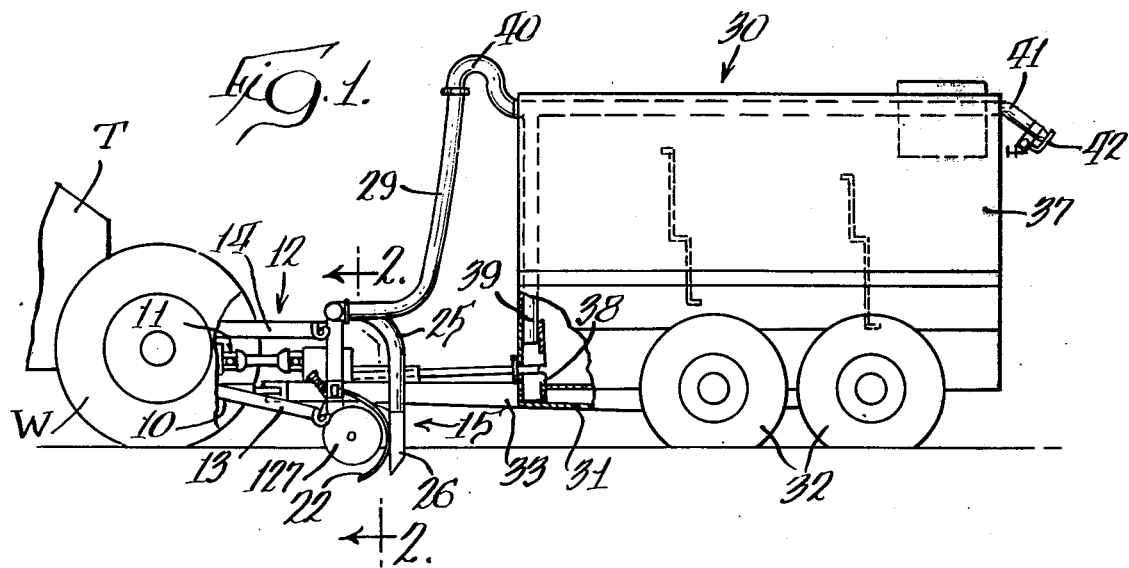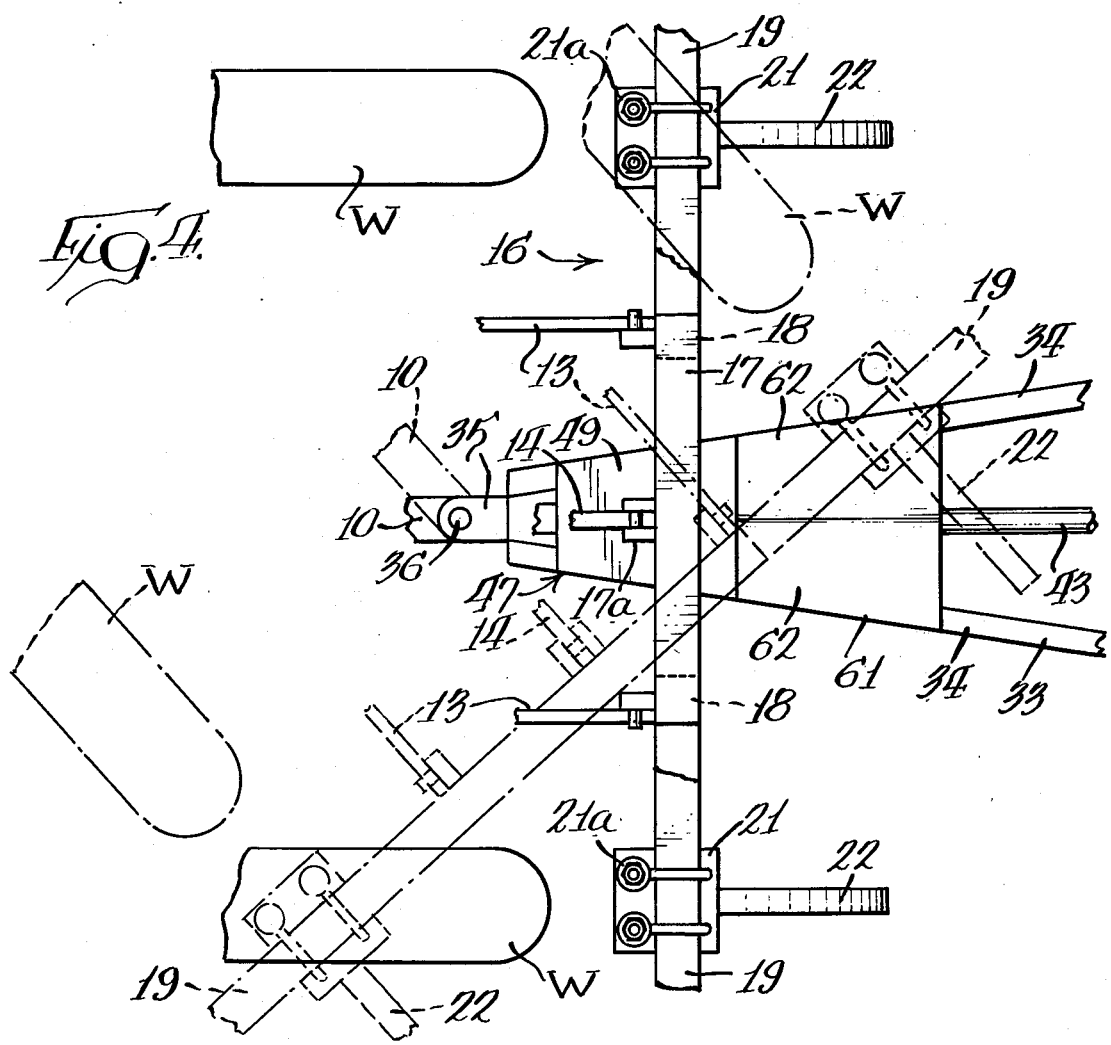

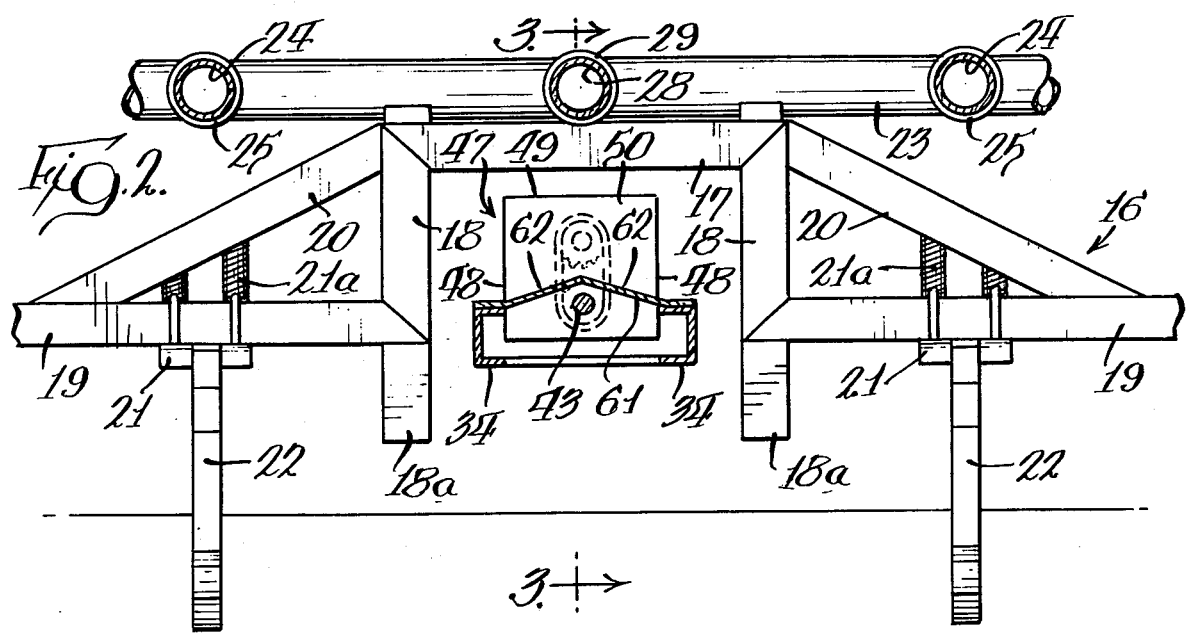
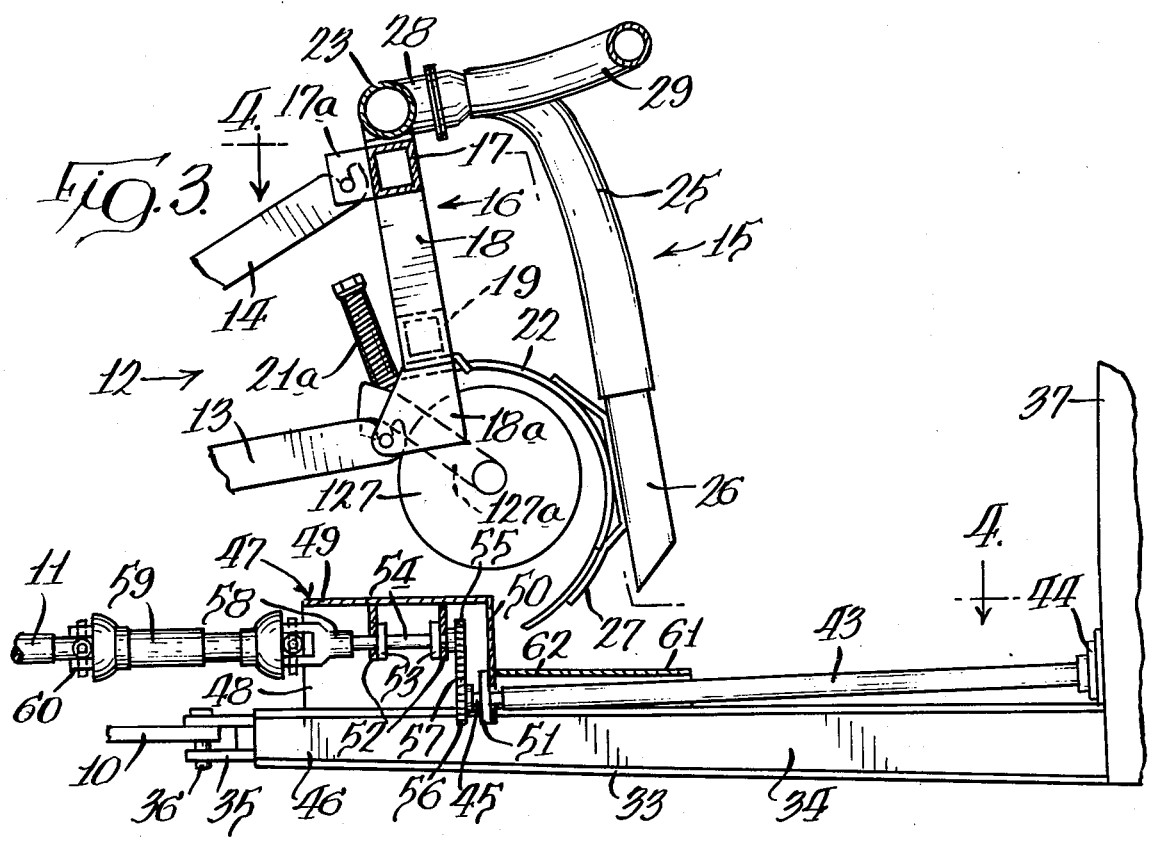

TRAILER FOR FARM TRACTORS WITH DRIVEN MEMBER POWERED BY P.T.O.

CROSS-REFERENCE TO RELATED APPLICATION

The pump and liquid delivery system which are disclosed generally in this application are described in detail and claimed in applicant's copending U.S. patent application Ser. No. 709,662, filed July 29, 1976.

BACKGROUND OF THE INVENTION

The use of liquid manure and liquid fertilizers for the fertilizing of fields has increased during the past 8 or 10 years, and is expected to increase further as animal waste handling systems are developed which separate the fibrous material that has almost no value as a fertilizer from the liquids which contain relatively high concentrations of soil building chemicals. Liquid manure may be applied in either of two ways. The first way is by spraying it over the surface of the ground; and the second way is by pumping it through injector nozzles which are positioned behind soil erupting chisel points or discs or blades of a cultivator or a power driven rotary cultivator.

One problem in the latter type of application has been the arrangement for moving a large supply tank of liquid manure around a field with the injector apparatus. The problem is that liquid manure must be pumped out of the tank in which it is transported, and this requires either a pump that may be driven off a tractor hydraulic system or a pump that may be driven from the tractor power take-off. Both for cost and reliability, a p.t.o. drive is preferred.

The location of a farm tractor p.t.o. shaft is such that the customary direct slip tube link between a p.t.o. shaft and a pump on a tank trailer interferes with the use of a liquid manure injector apparatus which is most conveniently mounted upon the three point hitch of the tractor. The problem is clearly illustrated by the drawings of Jurdyc U.S. Pat. No. 3,544,010, which discloses a liquid manure spray apparatus that has a pump driven from the tractor p.t.o. As is there shown, the slip tube link between the pump and the p.t.o. shaft is quite high above the ground; and simultaneous use of such a p.t.o. drive and an injector apparatus mounted on the three point hitch of the tractor is impossible.

The prior art discloses a number of proposals for moving a substantial supply of anhydrous ammonia around a field in conjunction with injector apparatus mounted upon a tractor three point hitch; but such devices do not present the problem that exists in a liquid manure spreader because a tank of anhydrous ammonia is under high pressure so no pump is required to discharge it through the injector nozzles. Accordingly, such patents as Vinyard U.S. Pat. No. 3,752,092, Pechacek U.S. Pat. No. 3,526,342, Dountas et al U.S. Pat. No. 3,295,482, and Pattison U.S. Pat. No. 3,218,999, all dealing with anhydrous ammonia applicators, are of no help in solving the problem of providing a liquid manure tank with a p.t.o. driven pump while avoiding any interference with the use of injector apparatus mounted upon the tractor three point hitch.

SUMMARY OF THE INVENTION

In accordance with the present invention, a tank trailer is provided with a draft tongue which is long enough that there is no interference between the front end of the trailer and a liquid manure injector carried upon the tractor three point hitch when the tractor is turned with respect to the tank trailer. A liquid pump in the front of the tank has a power train by means of which it may be detachably connected to a farm tractor p.t.o.

The power train consists of a drive shaft which is only slightly above the hitch tongue and several inches below the horizontal plane of the tractor p.t.o. The front of the drive shaft is spaced rearwardly from the front of the hitch tongue, and an input shaft is mounted on the forward portion of the hitch tongue generally in the plane of the tractor p.t.o. shaft. The front of the input shaft is adapted to receive a conventional slip tube link to the p.t.o.; while the rear of the input shaft makes a driving connection with the front of the drive shaft through sprockets and a chain.

A hood which spans the forward portion of the hitch tongue includes side plates and a top plate, and the input shaft is journalled in brackets which are mounted in the hood. The hood also has an upright back plate that carries a journal bearing for the forward end portion of the drive shaft; and in addition the forward part of the drive shaft immediately to the rear of the hood is covered by a shield which also spans the draft tongue.

The liquid fertilizer injector which is carried upon the tractor three point hitch has a tool bar the central portion of which is elevated so as to span the housing when the three point hitch is lowered to drive soil erupting chisels into the ground. When the three point hitch is raised to its maximum height, the lower ends of the chisels are in a plane between that of the draft tongue and that of the input shaft, and are completely to the rear of the input shaft. Accordingly, the tractor can be turned relative to the tank trailer without interference between the chisels and the input shaft; and the lower ends of the chisels clear the shield that covers the forward portion of the drive shaft.

THE DRAWINGS

FIG. 1 is a side elevational view of apparatus embodying the invention with a liquid manure injector apparatus in its working position, the tractor wheel being broken away to better illustrate the connections between the tank trailer and the tractor, and the front lower portion of the tank being broken away to show the pump;

FIG. 2 is a fragmentary sectional view on an enlarged scale taken substantially as indicated along the line 2—2 of FIG. 1;

FIG. 3 is a fragmentary sectional view taken substantially as indicated along the line 3—3 of FIG. 2; and FIG. 4 is a fragmentary plan view of the forward portion of the apparatus with the injector and tractor wheels illustrated in full lines in the position that they occupy when the unit is traveling forward, and in broken lines in the position that they occupy relative to the draft tongue when the tractor is turning sharply.

DETAILED DESCRIPTION OF THE INVENTION

As seen in FIG. 1 of the drawings, a tractor T has rear wheels W, and between the wheels are a draft connection 10, a power take-off 11 which is in a horizontal plane above that of the draft connection, and a three point hitch, indicated generally at 12, which includes the usual laterally spaced lower arms 13 and central upper arm 14.

Mounted upon the three point hitch 12 is a liquid manure injector apparatus, indicated generally at 15; while attached to the tractor draft connection 10 is a liquid manure spreader, indicated generally at 30.

Referring now particularly to FIGS. 2 to 4, the liquid injector apparatus comprises a tool bar, indicated generally at 16, which includes a transverse central bar 17 flanked by upright members 18, and lateral bars 19 together with diagonal braces 20. As best seen in FIG. 3, the tool bar elements 17, 18, 19 and 20 are preferably fabricated from square structural tubing; and the overall width of the tool bar may be, for example, 12 feet. Mounting of the liquid injector 15 upon the three point hitch 12 is by means of mounting plates 18a at the lower ends of the upright members 18, and a forwardly extending central bracket 17a on the central cross bar 17.

U-clamp brackets 21 upon the lateral tool bar members 19 resiliently support chisel shanks 22 which arch rearwardly from the tool bar as best seen in FIG. 3, with compression springs 21a providing for yielding of the chisel points 22. Conveniently, the liquid injector 15 is supplied with four chisel points.

Mounted upon the upper central tool bar portion 17 is a liquid manifold 23 which is seen in FIG. 2 to have rearwardly extending integral stub pipes 24 from which liquid supply hoses 25 connect with liquid discharge pipes 26 which are welded to brackets 27 on the rear of the chisel points 22. A liquid supply connection 28 at the center of the manifold 23 receives a connecting hose 29 through which liquid manure is pumped to the injector 15 from the manure spreader 30.

As illustrated in the drawings, the injector apparatus 15 is supplied with colters 127 which are journalled in supporting forks 127a forward of the chisel points 27. The colters are optional soil working members which, as is well known in the art, are desirable in certain types of soil to break the ground ahead of the chisel points 27.

Referring now particularly to FIG. 1, the liquid manure spreader 30 has a chassis 31 provided with tandem wheels 32; and extending forwardly from the chassis is an integral draft tongue 33 which is seen in FIG. 4 to consist of a pair of beams 34 which converge toward their forward ends; and as best seen in FIG. 3, at the forward extremity of the draft tongue 33 is a bifurcated bracket 35 which spans the tractor draft connection 10 from top to bottom and receives a removable pintle 36 by means of which the spreader 30 is attached to the tractor draft connection 10. As seen in FIG. 2, the structural members 34 forming the draft tongue are inwardly open channel members.

Mounted upon the chassis 31 is a tank 37 in the front of which is a driven member 38 which is a rotary pump which pumps liquid manure from the tank through a riser pipe 39 and a forwardly extending gooseneck 40 to which the liquid supply hose 29 for the injector 15 is connected. Also connected to the riser 39 is a rearwardly extending pipe 41 through which liquid manure may be distributed on the surface of the ground by means of an adjustable spray plate 42. When the liquid manure spreader 30 is being used to supply the injector 15, the spray plate 42 is locked shut; and conversely, when the unit 30 is being used to discharge liquid manure onto the soil, the hose 29 is disconnected and a plug is put into the end of the gooseneck 40.

Referring now particularly to FIGS. 3 and 4, the power train for the pump 38 consists of a drive shaft 43 the rear end of which is rotatable in a liquid tight journal 44 in the front wall of the tank 37, and the rear end of the drive shaft is directly connected to the pump 38. The drive shaft 43 is below the horizontal plane of the tractor p.t.o. 11, and the forward end 45 of the drive shaft 43 is at the forward portion of the draft tongue 33 but a substantial distance to the rear of the forward extremity of the forward tongue.

Spanning the forward portion 46 of the draft tongue 33 is a housing, indicated generally at 47, which consists of a pair of side plates 48 secured to the outer surfaces of the channel members 34, a top plate 49, and a transverse back plate 50. The forward end 45 of the drive shaft 43 extends through a hole in the housing back plate 50 and is rotatable in a journal 51. Depending from the housing top plate 49 are two brackets 52 which carry journals 53 for an input shaft 54. The input shaft 54 is drivingly interconnected with the drive shaft 43 through a sprocket 55 on the rear of the input shaft, a sprocket 56 on the front of the drive shaft, and a chain 57 trained around said sprockets. At the front of the input shaft 54 is a universal joint 58 which is adapted to be connected to the rear of a slip tube link 59 which is also detachably connected through another universal joint 60 with the tractor power take-off 11.

Extending rearwardly from the rear wall 50 of the housing 47 is a shield 61 which covers the forward portion of the drive shaft 43 and which is seen in FIG. 2 to have a pair of inclined panels 62 which occupy very shallow angles with respect to the horizontal. Consequently, if the tractor is turned when the three point hitch is not fully elevated to the position shown in FIG. 3, the tips of the chisel points 22 can slide over the inclined surfaces 62. The shield 61 supports the journal 51.

When the injector apparatus 15 is in the working position of FIGS. 1 and 2 with the chisel points 22 and the liquid discharge pipes 26 extending into the soil, the angle through which the tractor can be turned is limited by the clearance between the tool bar vertical members 18 and the sides of the draft tongue 33. On the other hand, when the injector apparatus 15 is elevated to the position of FIG. 3, the lowermost portions of the chisel points 22 clear the rear of the housing 47 even if the tractor is turned to about a 45° angle with respect to the draft tongue 33, as seen in FIG. 4. Such clearance occurs even if chisel points 22 are mounted immediately adjacent the upright members 18 of the tool bar. The draft tongue 33 is long enough that on a sharp turn as illustrated in FIG. 4 the lateral extremity of the tool bar 16 does not interfere with the front of the tank 37.

The foregoing detailed description is given for clearness of understanding only and no unnecessary limitations should be understood therefrom as modifications will be obvious to those skilled in the art.

I claim:

1. In combination, a support vehicle attached to a draft connection of a farm tractor which has a three point hitch and which has a power take-off in a horizontal plane above the level of the draft connection, and a soil working implement which is carried on said three point hitch and extending rearwardly of said draft connection, said soil working implement being movable by said three point hitch between a ground engaging position and a raised position, said support vehicle comprising, in combination:

a wheeled chassis;

a draft tongue at the front of said chassis at the level of the draft connection extending forwardly past said soil working implement and attached to said draft connection, the length of said draft tongue being sufficient that when the tractor is turned relative to the draft tongue interference between the soil working implement and the front of the chassis is avoided;

a driven member mounted at the front of the support vehicle;

and power transmission means for detachably connecting said driven member for operation from the tractor power take-off, said power transmission means including, a drive shaft extending along the draft tongue below the horizontal plane of the power take-off, an input shaft supported on the forward portion of the draft tongue in the horizontal plane of the power take-off, the rear of said input shaft, said drive shaft and said draft tongue, being so related to the soil working implement that when the soil working implement is raised by the three point hitch the lowermost part of said implement clears the rear of the input shaft and vertically clears the draft tongue and the drive shaft, so the tractor may be turned relative to the draft tongue without interference between said implement and any of said input shaft, said draft tongue and said drive shaft, means on the input shaft to detachably receive a drive link to the power take-off, and means drivingly interconnecting the input shaft with the drive shaft.

2. The combination of claim 1 which includes hood means surmounting the forward portion of the draft tongue, said hood means being defined by a top plate and side plates, and brackets secured in the upper portion of said hood means, the input shaft being journalled in said brackets.

3. The combination of claim 2 in which the hood means includes a back plate, and the forward end of the drive shaft is journalled forward of said back plate.

4. The combination of claim 3 which includes a shield spanning the draft tongue and enclosing the drive shaft immediately behind the hood.

5. The combinaton of claim 2 which includes a shield spanning the draft tongue and enclosing the drive shaft immediately behind the hood.

6. The combination of claim 2 which includes a journal mounted in the rear of the hood, the forward end of the drive shaft being rotatable in said journal.

7. The combination of claim 6 in which the front of the drive shaft and the rear of the input shaft are in a common vertical plane, and the means drivingly interconnecting said shafts comprises toothed elements on said shafts in said plane.

8. In liquid fertilizer injecting apparatus which is adapted for attachment to a farm tractor that has a three point hitch comprising links with rear extremities adapted to receive an implement, and power means for raising and lowering said links, a draft connection forward of said rear extremities and in a first horizontal plane, and a power take-off forward of said rear extremities and in a second horizontal plane above said first horizontal plane, said apparatus comprising, in combination:

a liquid fertilizer injecting implement comprising a transverse tool bar, means mounting said tool bar upon the rear extremities of said three point hitch links of a farm tractor, a plurality of laterally spaced chisel-points secured to said tool bar, said chisel-points being adapted to penetrate soil traversed by the tractor when the hitch links are lowered by the power means and to occupy a position with their lower extremities between the first horizontal plane and the second horizontal plane when said hitch links are raised by said power means, and a liquid fertilizer injector pipe operatively associated with each chisel-point and having a lower end slightly above the chisel-point lower extremity;

and a wheeled liquid fertilizer tank which has a draft tongue in the first horizontal plane and attached to said draft connection, the length of said draft tongue being sufficiently greater than the distance from said draft connection to the rearmost part of the injecting implement that when the tractor is turned relative to the draft tongue interference between the injecting implement and the tank is avoided, a pump at the front of the tank for pumping liquid from the tank to the injecting implement, and power transmission means detachably connecting said pump to the tractor power take-off, said power transmission means including a drive shaft extending along the draft tongue below the second horizontal plane, an input shaft supported on the forward portion of the draft tongue in said second horizontal plane, the rear of said input shaft, said drive shaft and said draft tongue being so related to the injecting implement that when said injecing implement is raised by the three point hitch links and power means the lowermost parts of the chisel-points clear the rear of the input shaft and vertically clear the drive shaft and the draft tongue so that the tractor may be turned relative to the draft tongue without interference between siad chisel-points and any of said draft tongue, said drive shaft and said input shaft, means on the input shaft to detachably receive a drive link to the power take-off, and means drivingly interconnecting the input shaft with the drive shaft.

* * * * *